United States Patent [19]

Anderson

[11] 4,403,855
[45] Sep. 13, 1983

[54] DISC FILM FRAME POSITION INDICATOR
[75] Inventor: Richard D. Anderson, Maple Grove, Minn.
[73] Assignee: Pako Corporation, Minneapolis, Minn.
[21] Appl. No.: 349,927
[22] Filed: Feb. 18, 1982
[51] Int. Cl.[3] .................... G03B 27/32; G03B 27/52
[52] U.S. Cl. ........................ 355/64; 354/217; 354/275; 354/121
[58] Field of Search ................ 355/45, 64; 430/496; 354/215, 217, 121, 275; 353/25, 110

[56] References Cited

U.S. PATENT DOCUMENTS

| | | | |
|---|---|---|---|
| 2,967,471 | 1/1961 | Sommermeyer | 354/215 |
| 3,206,758 | 9/1965 | Inglis | 354/217 X |
| 3,797,027 | 3/1974 | Sakagami | 354/215 X |
| 3,873,194 | 3/1975 | Schwartz | 353/110 |
| 4,132,469 | 1/1979 | Harvey | 353/25 |
| 4,194,822 | 3/1980 | Sethi | 354/121 |
| 4,203,733 | 5/1980 | Clifton et al. | 355/64 |
| 4,204,733 | 5/1980 | Modney et al. | 355/64 |
| 4,208,116 | 6/1980 | Morse | 354/275 |
| 4,208,117 | 6/1980 | Harvey et al. | 354/275 |
| 4,212,673 | 7/1980 | Sethi et al. | 430/496 |
| 4,255,034 | 3/1981 | Harvey et al. | 354/121 |
| 4,264,169 | 4/1981 | Harvey | 354/121 |
| 4,268,145 | 5/1981 | Harvey et al. | 354/121 |

OTHER PUBLICATIONS

Research Disclosure, Aug. 1978, No. 17287, 1978 Industrial Opportunities Ltd., Homewell, Havant, Hampshire, United Kingdom.
Research Disclosure, Aug. 1978, No. 17289, 1978 Industrial Opportunities Ltd., Homewell, Havant, Hampshire, Unted Kingdom

*Primary Examiner*—Richard A. Wintercorn
*Attorney, Agent, or Firm*—Kinney, Lange, Braddock, Westman and Fairbairn

[57] ABSTRACT

An apparatus in combination with a photographic printer indicates the position of a selected film frame at a print gate aperture relative to other film frames in a disc-like film unit having a plurality of film frames. The apparatus includes a disc-like film unit holder for rotationally indexing selected film frames to the print gate aperture having a first gear. A second gear provides motive force through a suitable actuating mechanism for rotationally indexing the disc-like film unit on the holder assembly. A third gear having indicia for indicating relative positions of the film frames in the disc film unit is rotatably positioned between the first and the second gear and cooperates with the first and the second gear to rotationally index the disc-like film unit on the holder assembly. Only the indicia that indicates the selected film frame positioned at the print gate aperture is viewable.

8 Claims, 3 Drawing Figures

DISC FILM FRAME POSITION INDICATOR

REFERENCE TO CO-PENDING APPLICATIONS

Reference is hereby made to the following co-pending patent applications filed on even date herewith and assigned to the same assignee: "Disc Film Advance Assembly" Ser. No. 349,926; "Disc Film Holder for Photographic Printer" Ser. No. 349,928; "Neghold Assembly" Ser. No. 349,929; and "Photographic Film Cleaner" Ser. No. 349,930.

BACKGROUND OF THE INVENTION

1. Field of the Invention

The present invention relates to an apparatus in a photographic printer that indicates the relative position of a selected film frame at a print gate aperture with respect to other film frames of a disc-like film unit.

2. Description of the Prior Art

Apparatus for indicating what film frame conventional strip film is positioned at the point gate aperture of a photographic printer are well known in the art. However, this type of apparatus is wholly unsuited for indicating a particular film frame in a disc-like film unit at a point gate wherein the individual image frames are located circumferentially about a central hub. Examples of a disc film unit are disclosed in the following U.S. patents:

| Inventor | U.S. Pat. No. |
| --- | --- |
| Sethi | 4,194,822 |
| Morse | 4,208,116 |
| Harvey et al | 4,208,117 |
| Sethi et al | 4,212,673 |
| Harvey et al | 4,255,034 |
| Harvey | 4,264,169 |
| Harvey et al | 4,268,145 |

A print gate indexing device for a disc-like film unit is disclosed in Research Disclosure of August, 1978, Disclosure No. 17287. Using a print gate indexing device, each image frame is manually advanced to the print gate. The disc-like film unit is held in a single horizontal plane while selected image frames are rotationally indexed to the print gate. Since the indexing of individual film frames to the print gate aperture is essentially manual, no indicator is shown to indicate what particular film frame is at the print gate aperture.

A rotational positioning device is also disclosed in Research Disclosure of August, 1978, Disclosure No. 17289. The rotational positioning device includes an assembly from which a central shaft extends upwardly for coaxially centering the disc-like film unit on the assembly. A pair of pins also extend upward from the assembly for extending through cooperating apertures in the hub of the disc film unit. No apparatus for indicating what selected film frame is positioned at the print gate aperture is shown.

The Clifton et al U.S. Pat. No. 4,203,664 illustrates a ratchet assembly used to position a disc film unit. A pneumatically operated drive pawl is provided for driving a ratchet gear. A film frame viewer is provided for viewing and classifying individual film frames prior to printing. No indicator is provided to indicate which film frame is presently at the film gate aperture.

The Modney et al U.S. Pat. No. 4,202,733 shows a wheel beneath the disc film unit holder having a plurality of notches corresponding to the number of frames in a disc film unit. A pair of diametrically opposed blocks containing ball plungers engage a pair of diametrically opposed notches in the wheel when the balls and notches are aligned. The wheel is allowed to rotate, thereby indexing individual film frames, when the balls are withdrawn from the notches, permitting the wheel to freely rotate. Again, a film frame viewer is provided for viewing individual film frames prior to printing and no indicator is provided to indicate which film frame is presently at the film gate aperture.

SUMMARY OF THE INVENTION

The present invention includes an apparatus in combination with a photographic printer having a print gate aperture and indicating which selected film frame of a disc film unit having a plurality of film frames is presently at the print gate aperture. The apparatus includes a disc-like film unit holder for rotationally indexing selected film frames to the print gate aperture, the disc film holder including a first gear. A second gear transfers motive force from a suitable mechanism for rotationally indexing the selected film frame to the print gate aperture. A third gear having indicia corresponding to the individual film frames on the disc-like film unit is positioned between the first and second gear and cooperates with the first and second gear to transfer motive force such that a disc-like film unit is rotationally indexed. The indicia of the third gear indicate which particular film frame is presently positioned at the print gate aperture. Only the indicium corresponding to the selected film frame at the print gate aperture is viewable.

DETAILED DESCRIPTION OF THE PREFERRED EMBODIMENTS

Figure 1:
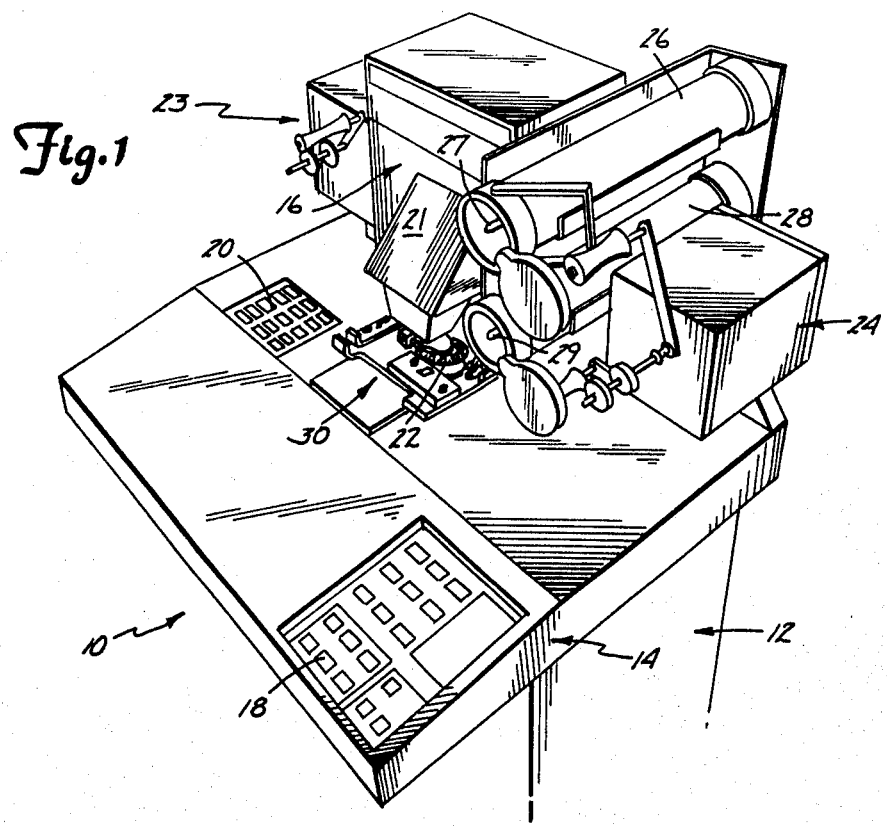
FIG. 1 is a perspective view of a photographic film unit having the film frame position indicator of the present invention in a neghold assembly.

Photographic printers in general are well known, a typical printer, generally indicated at 10, is illustrated in FIG. 1. The printer 10 is more fully described in the Harvey U.S. Pat. No. 4,235,551 and the Baert U.S. Pat. No. 4,175,852, both patents being assigned to the same assignee as the present application. Briefly, the printer includes a light-tight cabinet 12 which houses most of the printer mechanism, a console 14 which is mounted on top of the cabinet 12, and a lamp house 16 mounted on the console 14. The console 14 includes a pair of panels, control panel 18 and keyboard 20, which contain various switches and keys to control and initiate various functions of the printer operation.

Lamphouse 16 contains print lamps (not shown) which provide high intensity light. The light is directed downwardly by means of a drop cone assembly 21 in an essentially uniform light distribution. The light passes through a frame of a disc-like photographic film unit 22 which is clamped at a print gate aperture and passes downwardly into a cabinet 12. The light is imaged by optics contained within the cabinet 12 onto a selected portion of a web of photosensitive print paper (not shown) within the cabinet 12.

The printer 10, briefly described above, has been used in the past exclusively for transferring images from strip-type film, as indicated by a film supply assembly 23 and a film take up assembly 24. Rolls of the strip-type film are placed on the film supply and run along the top of the console 14 and onto the film takeup assembly 24. However, this type of arrangement is wholly unsuitable for printing images from disc-like film units having a plurality of image frames positioned in a generally circular arrangement (the disc-like film units are described subsequently).

To accommodate the disc-like film units in the above-mentioned printer, and other similar printers, the apparatus of the present invention has been provided. Included on the printer are at least two tube-like members 26, 28. A first tube-like member 26 includes a plurality of disc film units mounted on a spindle 27 which have been developed by a suitable photographic developing process awaiting transfer of their images onto print paper. A second tube-like member 28 contains disc film units mounted on a spindle 29 whose images have been transferred to and printed on print paper. A disc film unit is taken from the first tube-like member 26 and placed on the printer whereupon selected images are exposed on the photosensitive print paper (not shown). After all the selected images are printed on the print paper (not shown), the disc film unit is then placed in the second tube-like member 28 for return to the customer along with the corresponding photographic prints.

Figure 2:
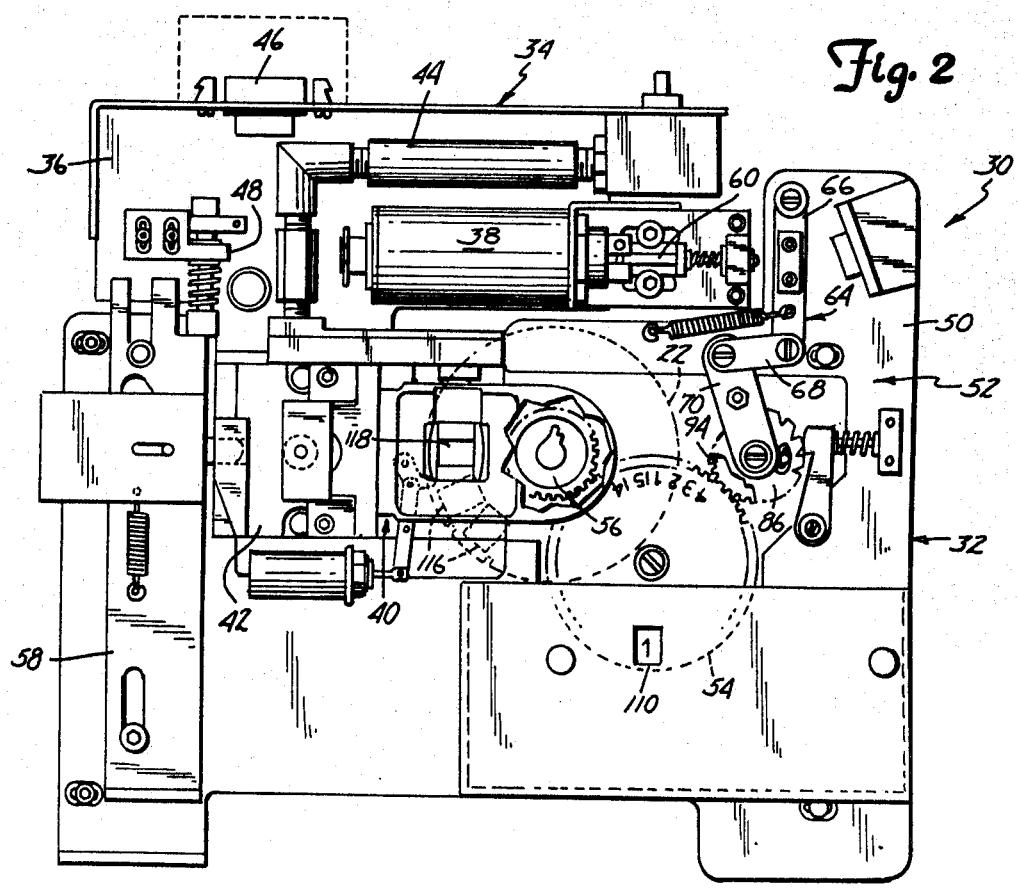
FIG. 2 is a top plan view of the film frame position indicator in the neghold assembly.

The disc-like film units are held in position with respect to the optical center of the printer, and individual image frames are indexed into position under the drop cone 21 by a neghold assembly 30, as more fully illustrated in FIG. 2. The neghold assembly 30 includes a movable film transport assembly 32 and a stationary film gate assembly 34. The film transport assembly 32 is movable in a generally horizontal plane along a pair of horizontal rails (not shown) from a position under the drop cone 21, as shown in FIG. 1 to a position closer to the front of console 14. This allows the operator to remove a film disc unit 22 from transport assembly 32 after printing, to place the completed disc on the spindle 29 within the takeup tube 28, to remove the next disc film 22 from the spindle 27 of the supply tube 26, and to place the next disc film 22 on the transport assembly 32. The transport assembly 32 is then pushed back into its normal operating position with the film disc 22 positioned with one frame below drop cone 21. FIG. 2 shows the neghold assembly 30 with the film transport assembly 32 in its fully inserted position under the drop cone 21, as shown in FIG. 1.

The film gate assembly 34 includes a film gate assembly main base 36 mounted on the paper deck 14 such that the film gate assembly 34 is optically centered to the photographic printer 10. The film gate assembly 34 includes a film advance solenoid 38, an aperture assembly 40 mounted on an adjustable base 42, an air cleaning assembly 44 for directing air onto the film to clean the film, an electrical connector 46 for electrically connecting the film gate assembly 34 to the photographic printer, and a transport base sensor mechanism 48 that provides an electrical signal which indicates when the film transport assembly 32 is in position.

The film transport assembly 32 includes a slibable base 50 that is slidably attached by the rails to the console 14 and the film gate assembly 34. Attaching the film transport assembly 32 to the film gate assembly 34 and the console 14, optically aligns the film transport assembly 32 with the photographic printer 10. The film transport assembly 32 includes a film advance mechanism 52, a disc film frame position indicator 54, a disc film holder 56, and a latching assembly 58.

Figure 3:
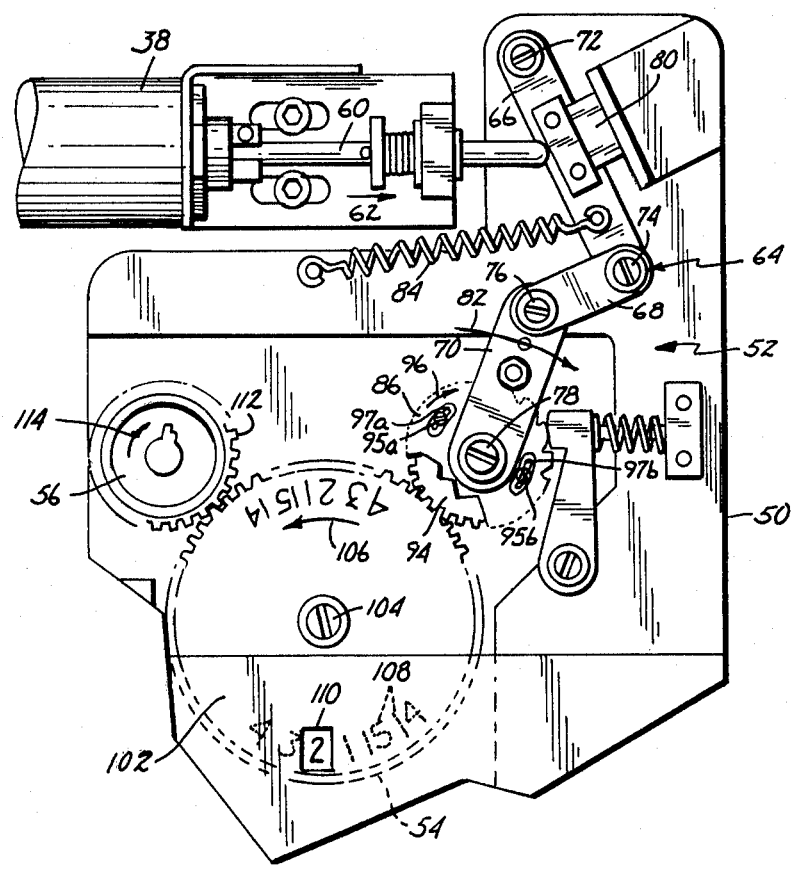
FIG. 3 is an enlarged fragmentary view of the film frame position indicator of the present invention.

The film advance solenoid 38 has a plunger 60 which moves in a general direction of arrow 62 when a solenoid is energized, as best illustrated in FIG. 3. The plunger 60 engages pivotal linkage 64 of the film advance mechanism 52. The pivotal linkage 64 includes a first pivot arm 66, a second pivot arm 68, and a third pivot arm 70. The first pivot arm 66 is pivotally connected to the base 50 at a first fixed pivot pin 72. The pivot arm 66 is pivotally connected to the second pivot arm 68 by a first floating pivot 74 and the pivot arm 68 in turn is connected to the third pivot arm 70 by a second floating pivot 76. The third pivot arm 70 is pivotally connected to the base 50 at a second fixed pivot pin 78. The pivot pins 72, 74, 76 and 78 preferably are of a suitable ball bearing construction for long-term reliable operation of the linkage 64.

The first pivot arm 66 has a striker block 80 mounted thereon which the plunger 60 of the solenoid 38 engages when the solenoid is energized. As is easily seen from FIG. 3, when the plunger 60 moves in the direction of arrow 62 and strikes the striker block 80, the linear movement of the plunger 60 is converted by the linkage 64 to an angular movement generally indicated by arrow 82. A coil spring 84 fixedly attached to the base 50 at one end and to the first pivot arm below the striker block 80 at another end biases the linkage 64 against the solenoid plunger 60 and returns the linkage in a direction opposite arrow 62 to a position prior to energization of the solenoid 38.

Angular movement, as indicated by arrow 82, is transmitted to a ratchet wheel 86 by the linkage 64. The ratchet wheel 86 is rotatably mounted to the base 50 coaxially with the second fixed pivot pin 78. The angular movement from the pivotal linkage 64 is transmitted to the ratchet wheel 86 by a ratchet wheel advancing pawl (not shown). The ratchet wheel advancing pawl is described in the previously-mentioned co-pending patent application, "Disc Film Advance Assembly", and is hereby incorporated by reference.

A ratchet gear 94 is coaxially and rotatably attached with respect to the second fixed pivot pin 78 and fixedly attached to the ratchet gear 86 for rotation therewith. When the ratchet wheel 86 is rotated by the advancing pawl (not shown), the ratchet gear 94 also rotates substantially the same angular distance as the ratchet gear 86 in a generally clockwise direction of arrow 96.

The ratchet gear 94 and the ratchet wheel 86 are attached to each other by screws 95a and 95b which extend through slots 97a and 97b in the ratchet wheel 86. The slots 97a and 97b are positioned on diametrically opposing sides of the fixed pivot pin 78. The screws 95a and 95b are threaded into cooperating threaded apertures (not shown) in the ratchet gear 94. The screws 95a and 95b when in a tightened position hold the ratchet gear 94 and the ratchet wheel 86 in a fixed angular relationship such that both the ratchet gear 94 and the ratchet wheel 86 rotate together.

The screws 95a and 95b also permit angular adjustment of the ratchet wheel with respect to the ratchet gear. When the screws 95a and 95b are untightened, the ratchet wheel 86 is adjustable in an angular direction by moving the ratchet wheel along the slots 97a and 97b with respect to the screws 95a and 95b. The screws 95a and 95b are then retightened to fixedly attach the ratchet gear 94 and the ratchet wheel 86 to each other. The angular adjustment of the ratchet wheel 86 is important in initial field installation of the film transport assembly.

A film frame position indicator gear 102 of the film frame position indicator 54 cooperates with the ratchet gear 94, as best illustrated in FIG. 3. The ratchet gear 94 advances the frame position indicator gear 102 in a general counterclockwise direction of arrow 106. The film frame position indicator gear 102 is rotatably mounted on the base 50 and rotates about suitable bearings 104. The gear 102 has a plurality of teeth which cooperate with the gear 94 such that the gear 102 moves in a generally counterclockwise direction as indicated by arrow 106.

Indicia 108, such as numbers, are located around the perimeter of the gear 102 on an upper surface. A covering illustrated by a window 110 covers the gear 102 including the advance mechanism and portions of the disc holder 56. The window 110 is positioned to show indicia corresponding to a selected film frame at a print gate aperture, which is discussed subsequently.

A disc film holder gear 112 of the disc film holder in turn cooperates with the frame position indicator gear 102. The frame position indicator gear 102 is an idler gear transferring angular motive force from the film advance mechanism 52 to the disc film holder 56. The frame position indicator gear turns the disc film holder gear 112 in a substantially clockwise direction as indicated by arrow 114. As best illustrated in FIG. 2, the disc film unit 22 having a plurality of individual film frames 116 positioned in a circumferential manner is positioned on the disc film holder 56. The disc film holder is described in further detail in the previously-mentioned co-pending application, "Disc Film Holder for Photographic Printer", and that description is hereby incorporated by reference. Examples of the disc-like film unit 22 are disclosed in the patents which were listed in the description of the prior art and which are herein incorporated by reference.

Selected individual film frames 116 are rotationally indexed on a holder to a film gate aperture 118 for proper transfer of the image to the photographic print paper. Substantial portions of the disc film unit are covered during the process of positioning selected individual film frames 116 at the print gate aperture, as described in the co-pending patent application, "Disc Film Holder for Photographic Printer". Consequently, the operator has trouble keeping track of which film frame is at the print gate aperture. The problem of keeping track of the particular film frame at the print gate aperture still exists although a disc film unit may have indicia thereon indicating the various film frames on the unit.

The present invention provides a simple manner of keeping track of the film frame during a print exposure cycle. In operation, the film unit 22 is placed on the disc film holder 56 with the initial film frame of the disc film unit being in position at the print gate. As shown in FIG. 2 and described in detail in the co-pending patent application, "Disc Film Holder for Photographic Printer", the disc film unit has a keyway which engages a key on the disc film holder requiring that the initial film frame be positioned at the print gate. Prior to placement of the disc film unit on the holder 56, the disc film frame position indicator of the present invention is advanced such that the numeral one is shown at the opening 110. Consequently, during the print exposure cycle, as each selected film frame is positioned at the print gate, the corresponding reference indicia will appear at the opening 110. When the print exposure cycle is completed, the next disc film unit is positioned on the holder 56 with the proper reference indicia showing through the opening 110 without having to index the film frame position indicator gear 102.

The film frame position indicator of the present invention is useful in the case of reprinting particular film frames desired by a customer. The customer simply indicates what film frames are desired by the corresponding number of the film frame, which is typically indicated on a hub of the film unit 22. The operator then indexes the film holder viewing the opening 110 until the desired film frame is positioned at the print gate.

CONCLUSION

The present invention provides an apparatus for keeping track of the individual film frames that are positioned at the print gate during an exposure cycle. In addition, in the case of reprints the present invention provides a quick and efficient manner for the operator to index the desired film frame for reprinting by simply viewing the indicia shown in the opening of the disc film frame position indicator.

Although the present invention has been described with reference to preferred embodiments, workers skilled in the art will recognize that changes may be made in form and detail without departing from the spirit and scope of the invention. For example, if it is advantageous to rotate a disc film unit 22 in an opposite direction, such as counterclockwise, a fourth gear may be added between the film frame indicator gear 102 and the ratchet gear 94. The fourth gear would then rotate in a counterclockwise direction and the film frame indicator gear 102 would rotate in a clockwise direction with the film holder gear 112 then rotating in a counterclockwise direction.

What is claimed is:

1. An apparatus in combination with a photographic printer having a print gate aperture, the apparatus indicating which of a plurality of film frames of a disc-like film unit is positioned at the print gate aperture, the apparatus comprising:

a base positioned on the photographic printer;

means for holding the disc-like film unit for rotational indexing of the selected film frame to the print gate aperture including a first gear, the means for holding a disc-like film unit being rotatably attached to the base;

means for actuating the rotational indexing of selected film frames to the print gate aperture including a second gear, the means for actuating positioned on the base;

indicia display means having a third gear for displaying indicia to indicate which of the film frames in a disc-like film unit is at the print gate aperture, the third gear being rotatably positioned on the base between the first and second gear and cooperating with the first and second gear such that the disc-like film unit is rotationally indexed; and cover means having a viewing portion for permitting viewing only the indicium that indicates the film frame positioned at the print gate aperture.

2. The apparatus of claim 1 wherein the indicia are located circumferentially on an upper surface of the third gear.

3. The apparatus of claim 1 wherein the indicia are numbered.

4. The apparatus of claim 1 wherein the means for actuating the rotational indexing includes:
- a ratchet wheel rotatably attached to the base and having a plurality of ratchet teeth; and
- means for rotationally indexing the ratchet wheel in an angular direction to bring the selected film frames to a print position at the print gate aperture.

5. The apparatus of claim 4 wherein the means for rotationally indexing the ratchet wheel in an angular direction includes means for providing a motive force to index the ratchet wheel; and linkage means for transferring the motive force to the means for rotationally indexing the ratchet wheel.

6. The apparatus of claim 5 wherein the linkage means includes:
- a first link having a first and second end and pivotally attached to the base proximate the first end;
- a second link having a first and second end and pivotally attached to the second end of the first link proximate a first end;
- a third link having a first and second end and pivotally attached to the second end of the second link proximate a first end and pivotally attached to the base at the second end coaxially with the ratchet wheel;
- and wherein the means for providing a motive force engaged to the first link and pivots the first link about the base and pivots the first, second and third links with respect to each other thereby indexing the disc film holder at selected film frames at a time and simultaneously positioning a corresponding indicia to indicate the selected film frames at the print gate aperture.

7. The apparatus of claim 6 wherein the means for providing a motive force is an electrically operated solenoid having a plunger which engages the first link.

8. An apparatus in combination with a photographic printer having a print gate aperture, the apparatus indicating which of a plurality of film frames of a disc-like film unit is positioned at the print gate aperture, the apparatus comprising:
- means for holding the disc-like film unit for rotation about a central axis;
- means for indexing a selected film frame of the plurality of film frames of the plurality of film frames of the disc-like film unit into alignment with the print gate aperture by rotating the means for holding the disc-like film unit;
- indicia display means having a plurality of indicia representative of different film frames of the disc unit arranged in a generally circular pattern, the indicia display means being rotatable with and as a result of rotation of the means for holding the disc-like film unit; and
- means having a viewing portion for permitting viewing of the indicium carried by the indicia display means that indicate the film frame positioned at the print gate aperture.

* * * * *